June 19, 1956 E. T. BARRETT 2,751,531
LIQUID LEVEL MEASURING DEVICE
Filed Sept. 14, 1951 2 Sheets-Sheet 1

INVENTOR
Elton T. Barrett
BY Curtis, Morris & Safford
ATTORNEYS

June 19, 1956

E. T. BARRETT 2,751,531

LIQUID LEVEL MEASURING DEVICE

Filed Sept. 14, 1951

INVENTOR
Elton T. Barrett
BY
Curtis, Morris & Safford
ATTORNEYS

United States Patent Office 2,751,531
Patented June 19, 1956

2,751,531

LIQUID LEVEL MEASURING DEVICE

Elton T. Barrett, Thornwood, N. Y., assignor to The Liquidometer Corp., Long Island City, N. Y.

Application September 14, 1951, Serial No. 246,622

1 Claim. (Cl. 317—246)

This invention relates to capacitance type gauges for measuring the amount of liquid in a tank or container.

Capacitance type gauges have been used in which two spaced concentric cylinders insulated from each other are positioned vertically in a tank and arranged so that the liquid in the tank can enter the space between the concentric cylinders. Because the dielectric constant of liquids is greater than the dielectric constant of air, the electrical capacitance between the two cylinders will gradually increase as the level of the liquid rises, that is, as the air between the cylinders is replaced by the liquid. The capacitance of the tank condenser formed by these cylinders accordingly is a measure of the level of the liquid in the tank. Measuring systems of this general type are described in the copending applications of Carl G. Sontheimer, Serial No. 141,452, filed January 31, 1950, now Patent No. 2,620,030, issued December 2, 1952; and Serial No. 65,094, filed December 14, 1948, now Patent No. 2,621,517, issued December 16, 1952.

Such liquid level measuring condensers are satisfactory for tanks having vertical sides, that is, where the cross-sectional area of the tank is the same at every level. Under these conditions, a given change in capacitance represents a given change in the volume of liquid in the tank, and therefore the capacitance may be used either as a measure of the level of the liquid in the tank or as a measure of the volume of the liquid in the tank.

However, when such condensers are used with irregular tanks, such as are used for fuel tanks in aircraft, in which the cross-sectional area of the tank is different at different levels, such a condenser measures the level of the liquid, and the volume of liquid can be determined only by subsequent calculations, which take into account the shape of the tank, or by utilizing pre-calibrated non-linear measuring apparatus. For example, an indicator hand may be made to move as a function of the level of the liquid in a particular tank, but the scale readings may be in terms of the total volume of liquid in one particular tank. Such arrangements, however, are unsatisfactory where a single measuring apparatus is used to measure the volume of liquid in several different tanks, either by switching the measuring apparatus from one tank to another or by connecting the measuring condensers in parallel.

In order to overcome this difficulty, it has been proposed to construct the measuring condensers with vertically positioned, overlapping plates in which the plates are so shaped that the extent of overlap corresponds to the horizontal cross-sectional area of the tank at each level. With such an arrangement, it is necessary to shape the condenser plates in accordance with the shape of the particular tank in which the condenser is to be used and to maintain sufficient capacity at the areas of minimum overlap to provide a suitable measurement.

In accordance with a preferred embodiment of the present invention, a series of plates are positioned in spaced relationship one above the other in the tank containing the liquid to be measured. Alternate plates are connected together as one terminal of the condenser and the intervening plates are connected together as the other terminal of the condenser. The capacitance between the successive plates is a function of the cross-sectional area of the tank at the particular level of the plates, this variation being accomplished, for example, by adjustment of the spacing between successive plates. With this arrangement, any desired accuracy can be obtained by utilizing enough plates to provide that accuracy and a relatively high total capacitance can be obtained, if desired, in a relatively limited space.

Moreover, the present invention permits the construction of tank condensers from prefabricated standardized components in which the taper is adjusted during assembly without the use of machining or cutting operations. The individual components of the condensers are such as to be easily and economically fabricated. Thus, the condenser is readily constructed to provide the exact taper required by the configuration of a particular tank, and the condenser can be disassembled later and reconstructed for use in a tank of different configuration.

Other aspects, objects, and advantages of this invention will be in part pointed out in and in part apparent from the following description considered in conjunction with the following drawings, in which.

Figure 1:
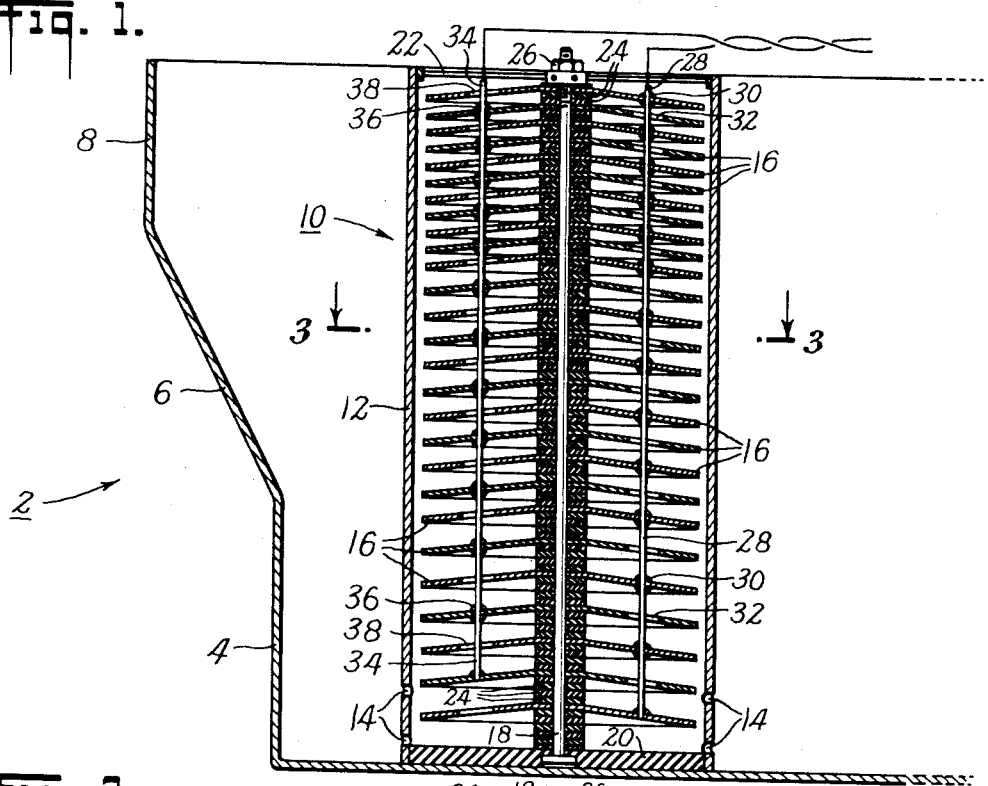
Figure 1 is a vertical sectional view of a measuring condenser positioned in a container having different cross-sectional areas at different levels.

As shown in Figure 1, a container, generally indicated at 2, is adapted to contain a liquid whose volume is to be measured. It will be noted that a lower portion 4 of the side wall of this tank is substantially vertical and that the wall then tapers outwardly, as at 6, and that the upper portion 8 of the wall of the tank is again vertical.

A measuring condenser, generally indicated at 10, extends from the bottom to the top of this tank and is provided with an outer cylindrical housing 12 having small openings 14 to permit the liquid in the tank 2 to seek its own level within the cylinder 12. A number of condenser plates 16 are positioned in spaced relationship, one above the other, within the cylinder 12.

These plates are supported by a central rod 18 that extends from a base 20 of the cylinder 12 to a spider 22 or other suitable support at the top of the cylinder 12. The rod 18 may be formed of insulating material, if desired, or the plates 16 may be insulated from the rod 18 by suitable washers or insulating spacers, any suitable mechanical arrangement being acceptable so long as it does not provide an electrical connection or excessively low resistance circuit between the plates 16.

In order to provide the spacing between the plates, spacers 24 of suitable insulating material, such as plastic or other material which will not be affected by the particular liquid with which the condenser is to be used, are positioned between the successive plates. The entire assembly of spacers 24 and plates 16 is held in compression by means of a nut 26 secured to the central supporting rod 18.

A vertical lead 28 is connected to alternate ones of the plates 16, as by the solder connections 30, the lead 28 passing through clearance openings 32 (see also Figure 3) in the intervening plates. The other plates are connected to a vertically extending conductor 34, as by solder connections 36, the lead 34 passing through clearance openings 38 in the plates that are connected to the lead 28.

With this arrangement, the capacitance measured between the leads 28 and 34 will increase as the level of the liquid increases within the cylinder 12. Any suitable measuring equipment may be utilized to measure this capacitance, for example, such as is described in detail in the above-identified applications of Carl G. Sontheimer.

In order that the measured capacitance will bear a known relationship to the volume of liquid in the tank, that is, so that a given change in capacitance of the condenser 10 will represent a given change in volume of liquid in the tank 2 irrespective of the level of the liquid, the spacing between the plates is arranged to correspond to the change in cross-sectional area of the tank at each level. For example, as shown in Figure 1, the condenser plates horizontally opposite the portion of the side wall indicated at 4, are equally spaced because this portion of the side wall is vertical. In addition, these plates have greater spacing than the other plates of the condenser because the cross-sectional area of the tank is the smallest at these levels. Thus, when the surface of the liquid is along the portion 4 of the side wall of the tank, a given change in level corresponds to the minimum change in volume and, accordingly, the relatively large spacing of the plate 16 at these levels causes a corresponding smaller change in the capacitance of the condenser 10.

The condenser plates 16 that are opposite the flared portion 6 of the side wall of the tank have successively decreasing spacing at correspondingly greater heights above the base of the tank, so that the desired linear relationship is retained. The condenser plates opposite the upper wall portion 8 of the tank have uniform spacing, because the wall portion 8 is vertical, but these plates are spaced closer together than the plates opposite the wall portion 4 because at this level a given change in the level of the liquid corresponds to a greater change in volume of the liquid and, therefore, should produce a correspondingly greater change in the capacitance of the condenser.

The variable spacing between the plates 16 may be accomplished by using spacers 24 of different thickness, but preferably is accomplished by using different numbers of thinner standardized spacers between the successive plates. If high accuracy is not required, the plates positioned opposite relatively short tapered portions of the tank walls may be uniformly spaced with the capacitance between the successive condenser plates corresponding to the cross-sectional area of the tank at the mid-point of the tapered portion of the walls.

Thus, all of the plates 16 may be identical and may be fabricated by simple stamping or other operations so that the components of the condenser may be completely prefabricated and a tank condenser having any desired taper subsequently constructed therefrom, without expensive machining or cutting operations.

Figure 3:
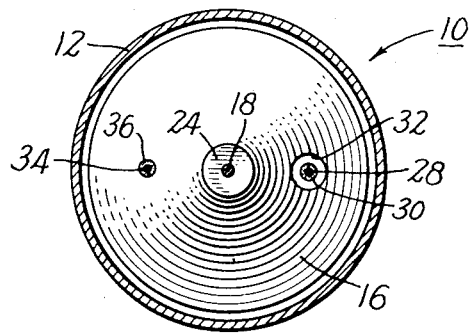
Figure 3 is a sectional view taken on line 3—3 of Figure 1.

In order to prevent liquid from being trapped between the successive condenser plates, the plates 16 may be made slightly conical in shape, a flat truncated portion being provided near the center to fit between the spacers 24. The downwardly sloping surfaces thus permit the liquid to drain from the surfaces of the plates as the liquid level in the tank is lowered, and the conical shape produces a more rigid condenser construction that is less affected by vibration or other mechanical forces. The condenser plates are circular in outline as shown in Figure 3, but it is apparent that any other desired shape may be utilized.

Figure 2:
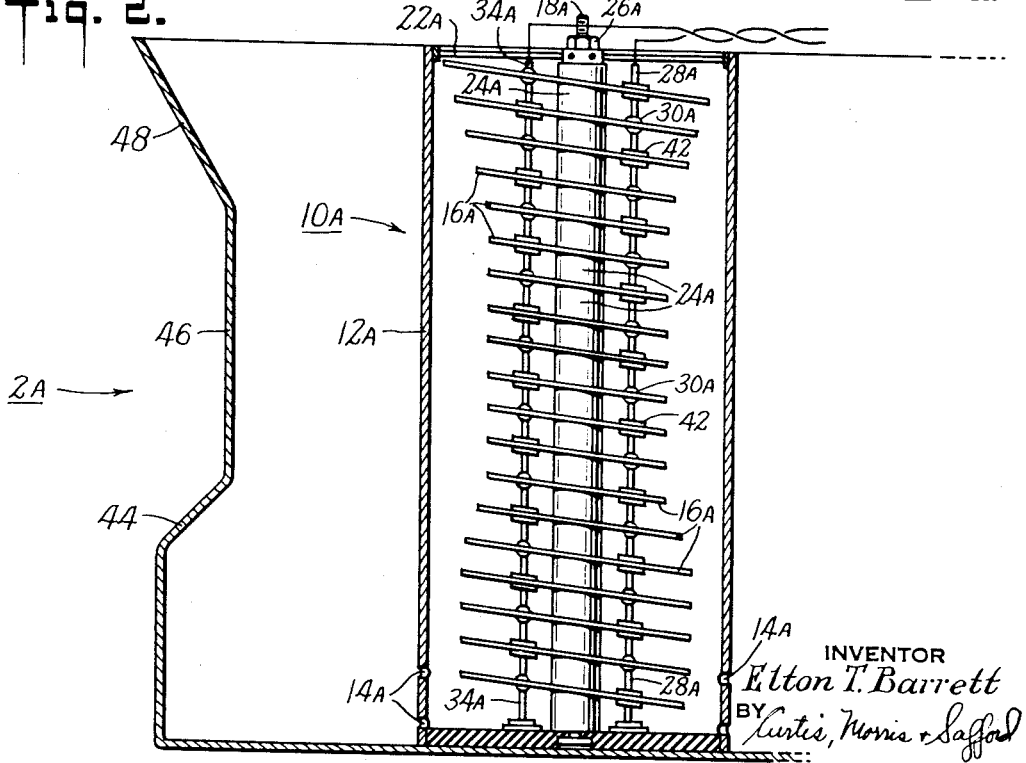
Figure 2 is a vertical sectional view of another tank condenser in which the taper is accomplished by using condenser plates of different sizes.

In Figure 2, which shows another embodiment of the invention, certain parts corresponding to parts shown in Figures 1 and 2 have been given similar reference characters followed by the suffix "A." In this embodiment of the invention, the condenser plates 16A are supported on a central supporting rod 18A in a manner generally similar to that shown in Figure 1, except that the spacers 24A between the successive condenser plates provide uniform spacing of the condenser plates and are provided with angular surfaces so that the plates 16A, which in this example are substantially planar, are supported at a slight angle relative to the horizontal to prevent the entrapment of liquids between the plates as described above.

Alternate plates 16A are connected to a lead 28A, as by the connections indicated at 30A, and are insulated from the intervening plates by insulating members 42 so that the lead 28A may be made to provide mechanical support for both sets of plates, although it is electrically connected only to one set of the plates. The intervening plates 16A, which are not connected to the conductors 28A, are connected, as in the previous example, to the conductor 34A, this conductor being secured by an insulator to the plates to which it is not connected electrically so as to provide an additional mechanical support for these plates.

In this example, the size of the plates 16A is varied in accordance with the variation in the cross-sectional dimensions of the container 2A. Thus, it will be noted that, proceeding upwardly from the bottom of the container 2A, the plates 16A are of uniform size so long as the cross-sectional area of the tank remains unchanged. At the wall portion 44, where the cross-sectional area of the tank is gradually reduced, the areas of the plates at this level are correspondingly reduced. Opposite the wall section 46, which is vertical, the plates are again of uniform size, but smaller than the plates near the bottom of the tank because of the smaller horizontal area of the tank at these levels. Near the top of the tank the walls again flare outwardly, as at 48, with a corresponding increase in the area of the plates 16A. Thus, the plates 16A are selected so that the size of the plate at each level of the tank corresponds to the cross-sectional area of the tank at that level. With this arrangement, a given change in volume will always produce a smiliar change in capacitance, irrespective of the level of the liquid in the tank.

The plates 16A may be stamped metal sheets which may be prefabricated in a single size and subsequently cut to the desired dimensions or the plates may be prefabricated in a number of standardized sizes and the proper size selected to give the desired taper.

It will be apparent that the total number of plates to be used in any particular tank condenser will depend upon the size of the plates, the total capacitance which is desired, and the accuracy with which the measurements are to be made. Greater accuracy can be achieved by utilizing a larger number of plates, the area of each of the plates being reduced to maintain the desired total capacity.

Figure 4:
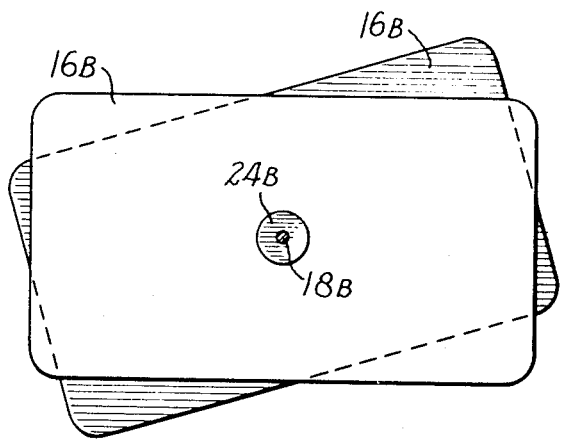
Figure 4 is a horizontal sectional view of a condenser utilizing rectangular plates in which the capacitance taper is achieved by proper orientation of the plates.
Figure 5:
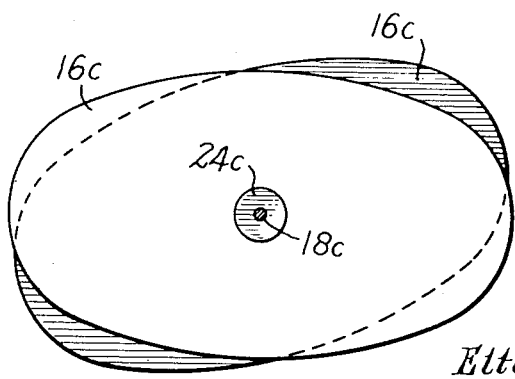
Figure 5 is a horizontal sectional view of a condenser utilizing oval plates in which the capacitance taper is controlled both by the choice of size of plates and by their orientation.

It is possible also to utilize non-circular plates and to obtain the capacitance variation by orienting each of the plates relative to the adjacent plates in such manner as to give the desired taper. Thus, for example, the plates may be made rectangular as shown by plates 16B in Figure 4. These plates are arranged so that prior to the final clamping of the plates they can be rotated around the central supporting rod 18B. Thus, as two successive plates are positioned with their longest axes parallel, there will be maximum capacity between the plates, but by rotating one of the plates with respect to the other, the effective capacity between the plates will be reduced. When arrangements such as this are utilized, it may be desirable to provide slotted openings in the plates to permit the passage of the conductors 28A and 34A which are fastened to the desired plates subsequent to assembly and adjustment. In other instances, it may be desirable to assemble the plates and then make the desired connections by means of wire leads along the edges of the plates which are soldered or otherwise secured to the desired condenser plates.

Another possible arrangement of the plates is to support one set of plates from the cylinder 12A and to support the other set of plates on a suitable column, those plates supported by the column being individually rotatable so that after the plates have been properly oriented they can then be clamped in fixed position.

From the foregoing, it will be apparent that the embodiments of the invention herein set forth are well adapted to attain the ends and objects of the invention and that they are susceptible of fabrication in such forms as to materially simplify and reduce the costs of quantity production. It is clear also from what has been said above that the invention may assume a variety of forms and that it can be modified readily in accordance with the particular use to which the invention is to be put. No attempt has been made herein to be exhaustive of the various forms and modifications of the invention, and it is not intended that the following claim be limited to the particular embodiments shown and described, except as such limitation may be required by the prior art.

I claim:

In a liquid level measuring system wherein the liquid is measured by means of change in electrical capacitance, a measuring condenser adapted for use in a tank having different cross-sectional areas at different levels comprising a plurality of condenser plates, said plates describing the surface of truncated cone, means supporting said plates in overlapping relationship one above each other, insulating spacers positioned between adjacent truncated portions of said plates, means connecting together alternate ones of said plates, and means connecting together the intervening ones of said plates, the vertical distance between adjacent surfaces of certain successive ones of said plates being different from the vertical distance between other successive ones of said plates, said plates having surfaces forming an acute angle with the horizontal so that liquid will not be trapped between the plates.

References Cited in the file of this patent

UNITED STATES PATENTS

| | | |
|---|---|---|
| 2,409,073 | Sias | Oct. 8, 1946 |
| 2,511,398 | De Giers | June 13, 1950 |
| 2,648,982 | Condon | Aug. 18, 1953 |

FOREIGN PATENTS

| | | |
|---|---|---|
| 481,103 | Great Britain | Feb. 28, 1938 |
| 464,254 | Great Britain | Apr. 14, 1947 |